United States Patent [19]

Eidenschink et al.

[11] 4,285,829
[45] Aug. 25, 1981

[54] LIQUID-CRYSTALLINE DIELECTRIC

[75] Inventors: Rudolf Eidenschink, Dieburg; Ludwig Pohl, Darmstadt; Georg Weber, Erzhausen; Fernando Del Pino, Darmstadt, all of Fed. Rep. of Germany

[73] Assignee: Merck Patent Gesellschaft mit beschrankter Haftung, Darmstadt, Fed. Rep. of Germany

[21] Appl. No.: 59,346

[22] Filed: Jul. 20, 1979

[30] Foreign Application Priority Data

Jul. 21, 1978 [DE] Fed. Rep. of Germany ....... 2832112

[51] Int. Cl.³ .......................... C09K 3/34; C02F 1/13
[52] U.S. Cl. ............................ 252/299.63; 252/408; 350/350 R
[58] Field of Search .............................. 252/299, 408; 350/350 R

[56] References Cited

U.S. PATENT DOCUMENTS

| 3,947,375 | 3/1976 | Gray et al. | 252/299 |
|---|---|---|---|
| 4,011,173 | 3/1977 | Steinstrasser | 252/299 |
| 4,065,489 | 12/1977 | Steinstrasser et al. | 252/299 |
| 4,073,742 | 2/1978 | Erdmann et al. | 252/299 |
| 4,077,900 | 3/1978 | Pohl et al. | 252/299 |
| 4,130,502 | 12/1978 | Eidenschink et al. | 252/299 |
| 4,154,697 | 5/1979 | Eidenschink et al. | 252/299 |
| 4,181,625 | 1/1980 | Eidenschink et al. | 252/299 |
| 4,229,315 | 10/1980 | Krause et al. | 252/299 |

FOREIGN PATENT DOCUMENTS

| 2837218 | 3/1979 | Fed. Rep. of Germany | 252/299 |
|---|---|---|---|
| 2839639 | 3/1979 | Fed. Rep. of Germany | 252/299 |
| 2842320 | 4/1979 | Fed. Rep. of Germany | 252/299 |
| 2802588 | 6/1979 | Fed. Rep. of Germany | 252/299 |
| 2800553 | 7/1979 | Fed. Rep. of Germany | 252/299 |
| 54-5886 | 1/1979 | Japan | 252/299 |
| 54-99785 | 8/1979 | Japan | 252/299 |
| 54-99786 | 8/1979 | Japan | 252/299 |
| 1376115 | 12/1974 | United Kingdom | 252/299 |

*Primary Examiner*—Teddy S. Gron
*Attorney, Agent, or Firm*—Millen & White

[57] ABSTRACT

A liquid-crystalline dielectric having a positive dielectric anisotropy comprises a biphenyl derivative of the formula

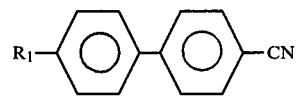

wherein $R_1$ is alkyl of 1–4 C atoms or alkoxy of 1–3 C atoms, and a phenylcyclohexane derivative of the formula

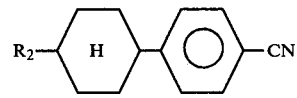

wherein $R_2$ is alkyl of 1–4 C atoms, in a weight ratio of 3:1 to 1:3.

8 Claims, No Drawings

LIQUID-CRYSTALLINE DIELECTRIC

BACKGROUND OF THE INVENTION

The present invention relates to a liquid-crystalline dielectric which makes it possible to operate electro-optical displays at particularly low voltages.

For electro-optical display elements, the properties of nematic or nematic-cholesteric liquid-crystalline materials are being increasingly exploited in order to significantly vary their optical properties, such as light absorption, birefringence, reflectance or color under the influence of electric fields. The functioning of such display elements is based, for example, on the phenomena of dynamic scattering, the deformation of aligned phases, the Schadt-Helfrich effect in the twisted cell or the cholesteric-nematic phase transition.

For the industrial application of these effects in electronic components, liquid-crystalline dielectrics are required which must meet a large number of demands. Their chemical resistance to moisture, air and physical influences, such as heat, radiation in the infra-red, visible and ultraviolet range, and direct and alternating electric fields are of particular importance. Moreover, industrially usable liquid-crystalline dielectrics are required to have a liquid-crystalline mesophase in the temperature range of at least +10° C. to +50° C., preferably from 0° C. to 60° C., and a viscosity at room temperature which should be as low as possible and should preferably be not more than $70 \cdot 10^{-3}$ Pa seconds. Finally, they must have no characteristic absorption in the range of visible light, i.e., they must be colorless.

Liquid-crystalline dielectrics for display elements, the functioning of which is based on the Schadt-Helfrich effect in the twisted cell, should additionally have as high a dielectric anisotropy (DKA) as possible in order to be able to manage with the lowest possible control voltages.

A number of liquid-crystalline compounds which have a positive DKA and which meet the stability requirements of dielectrics for electronic components and are also colorless are already known. These include, in particular, the p,p'-disubstituted biphenyl derivatives described in German Offenlegungsschrift No. 2,356,085 (U.S. Pat. No. 3,947,375) and the phenylcyclohexane derivatives according to German Offenlegungsschrift No. 2,636,684 (U.S. Pat. No. 4,130,502). These two classes of liquid-crystalline base substances are employed very widely in the manufacture of electro-optical display devices, in particular for wrist watches and pocket calculators. In these applications, the lowest possible operating voltage is desirable since in this way the number of batteries required can be reduced or power-consuming voltage multipliers can be omitted.

The deformation of a liquid-crystalline dielectric becomes visible only above a threshold voltage which is independent of the layer thickness. The magnitude of this voltage depends in a known manner on the DKA and on the elasticity constants of the liquid-crystal material.

SUMMARY OF THE INVENTION

Accordingly, it is an object of the present invention to provide novel liquid crystalline dielectrics having the aforementioned desirable characteristics, especially a low threshold voltage.

These objects have been attained by providing dielectrics which contain at least one biphenyl derivative of formula (I)

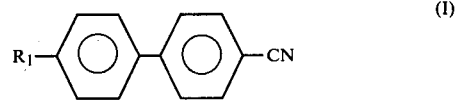

wherein $R_1$ is alkyl of 1–4 C atoms or alkoxy of 1–3 C atoms, and at least one phenylcyclohexane derivative of formula (II)

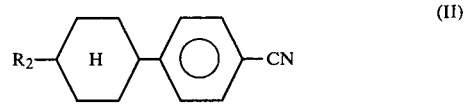

wherein $R_2$ is alkyl of 1–4 C atoms, in a ratio of 3:1 to 1:3 by weight.

These dielectrics have a positive DKA and show surprisingly low threshold voltages and thus make it possible to manufacture liquid-crystal display elements having favorable operating voltages.

DETAILED DESCRIPTION OF THE INVENTION

The reason for this highly advantageous effect is not yet clear. Possibly, the dispersion forces between the alkyl and alkoxy groups which are linked to aromatic or saturated rings, have the effect of lowering the resistances to the deformation forces acting in different directions so that lower elastic constants result, as compared with the cyanobiphenyls on the one hand and the cyanophenylcyclohexanes on the other hand.

The details of the dielectric of this invention as described above are critical to the attainment of the superior properties of DKA, low threshold voltage, etc. As an example of this criticality, it is to be noted that U.S. Pat. No. 4,130,502 (Japanese Laid-Open Application No. 53-23,957) describes a liquid-crystalline dielectric (Example 8) which consists of 30 parts by weight of a cyanobiphenyl derivative and 70 parts by weight of a mixture of 3 phenylcyclohexane derivatives; however, this dielectric, only one of the 4 components of which is covered by formula (II), surprisingly does not show the advantageous properties of the dielectric according to this invention. In particular, that prior art dielectric exhibits a substantially higher threshold voltage of about 3 V, thereby requiring at least a 4.5 V power source for the operation of liquid-crystal displays containing that prior art dielectric.

The components of the dielectric according to this invention, i.e., the biphenyl derivatives of formula (I) and the phenylcyclohexane derivatives of formula (II), are known from German Offenlegungsschriften Nos. 2,356,085 and 2,636,684, and the mentioned equivalent references. The disclosures thereof are incorporated by reference herein. However, as single compounds, they have such unfavorable melting points and clear points—predominantly, they show only a monotropic nematic phase—that they have hitherto not been taken into consideration as base components of liquid-crystalline dielectrics. In particular, this is because dielectrics having the particularly low threshold voltage of the products according to this invention were not obtained even by a combination with other known liquid-crystalline compounds having more favorable melting points and clear points.

It has been found that, within the scope of this invention, the mixing ratio of the components of formulae (I) and (II) is of essential importance. If the components are mixed in a ratio outside the indicated limits of 3:1 to 1:3, the advantageous properties of the dielectrics according to this invention are no longer attained. In these cases, the properties of the mixtures closely approach those of the component forming the main constituent therein. Those liquid-crystalline dielectrics according to this invention have proved to be particularly favorable in which the ratio of the components by weight lies within the range from 2:1 to 1:2, e.g., 1.7:1 to 1:1.8, the best results being obtained with those mixtures in which the quantity of the phenylcyclohexane component(s) of formula (II) predominates.

In the liquid-crystalline dielectrics according to this invention, the temperature range of the nematic phase is, as a rule, substantially more favorable than that of the individual compounds or even that of mixtures which consist exclusively of compounds of either formula (I) or formula (II). However, inasmuch as this temperature range of the products according to this invention does not meet the demands of an industrially usable liquid-crystalline dielectric since, in particular, the clear point is still too low in some cases, the latter can be shifted into the desired temperature range, in a manner which is in itself known, by the addition of one or more liquid-crystalline compounds having a high clear point. For this purpose, the biphenyl esters of German Offenlegungsschrift No. 2,535,046 (U.S. Pat. No. 4,065,489), the cyano-substituted biphenyl esters having a positive DKA according to German Offenlegungsschrift No. 2,613,293 (U.S. Pat. No. 4,073,742), the hexahydroterphenyl derivatives according to German Offenlegungsschrift No. 2,701,591 (U.S. Pat. No. 4,154,697) and particularly the cyclohexane derivatives of formula (III)

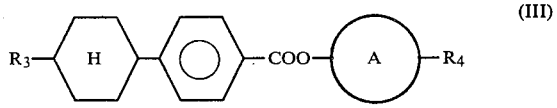

are particularly suitable. In formula (III), the ring A is either a 1,4-disubstituted phenyl ring or a trans-1,4-disubstituted cyclohexane ring. The radicals $R_3$ and $R_4$ are, as a rule, straight-chain alkyl groups of 1–8 C atoms. If the ring A is phenyl, however, $R_4$ can also be alkoxy or alkanoyloxy, of up to 8 C atoms, or CN. These compounds, their manufacture and their use are extensively described in German Patent Application No. P 2,800,553 (U.S. application Ser. No. 001,084, filed Jan. 5, 1979). Surprisingly, the advantageous properties of the liquid-crystalline dielectrics of this invention are not lost even by relatively large additions of this type, which can amount to as much as 45 percent by weight of the finished dielectric, e.g., 5–45 wt%, typically 7–35 wt%.

The dielectrics according to this invention thus contain, as a rule, at least 55, preferably 65 or more, percent by weight of a mixture of at least one compound of each of the formulae (I) and (II) in the indicated ratio by weight. The quantity and nature of the other constituents depend in the individual case on the construction and the mode of operation, for example, static triggering or multiplex-triggering, of the liquid-crystal display elements in which the dielectric is to be used. Thus, it is also possible to add compounds according to German Patent Specification No. 2,321,632 (U.S. Pat. No. 4,011,173) for a further increase of the DKA and to add substances according to German Offenlegungsschrift No. 2,209,127 (U.K. Pat. No. 1,376,115) or 2,637,430 (U.S. Pat. No. 4,077,900) for the orientation of the liquid-crystal molecules in the display element.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

In the examples, Mp. is the melting point and Cp. is the clear point of a liquid-crystalline substance in degrees centigrade.

EXAMPLE 1

A dielectric consisting of
38% of 4-n-butyl-1-(4-cyanophenyl)-cyclohexane,
20% of 4-ethyl-4'-cyanobiphenyl,
17% of 4-ethoxy-4'-cyanobiphenyl and
25% of 4-propyloxy-4'-cyanobiphenyl
has a Mp. of 6°, a Cp. of 42° and a viscosity of $42 \cdot 10^{-3}$ Pa seconds at 20°. The DKA is +13. The dielectric is very suitable for use in a twisted cell with static triggering.

EXAMPLE 2

A dielectric consisting of
29% of 4-ethyl-1-(4-cyanophenyl)-cyclohexane,
31% of 4-n-butyl-1-(4-cyanophenyl)-cyclohexane,
19% of 4-ethyl-4'-cyanobiphenyl,
6% of 4-methoxy-4'-cyanobiphenyl and
15% of 4-propyloxy-4'-cyanobiphenyl
has a Mp. of 1°, a Cp. of 26° and a viscosity of $37 \cdot 10^{-3}$ Pa seconds at 20°. The DKA is +12. An addition of 15% of 4-n-propylbiphenylyl-(4')-carboxylic acid 4'-cyanophenyl ester raises the clear point to 58° so that the dielectric can be used in a twisted cell with static triggering.

EXAMPLE 3

10% of 4-ethyl-1-(4-cyanophenyl)-cyclohexane,
37% of 4-n-butyl-1-(4-cyanophenyl)-cyclohexane,
19% of 4-ethyl-4'-cyanobiphenyl,
16% of 4-propyloxy-4'-cyanobiphenyl,
8% of 4-(4-ethylcyclohexyl)-benzoic acid 4'-cyanophenyl ester and
10% of 4-(4-n-pentylcyclohexyl)-benzoic acid 4'-cyanophenyl ester
has a Mp. of 0°, a Cp. of 60° and a viscosity of $40 \cdot 10^{-3}$ Pa seconds at 20°. The DKA is +14.6, the optical anisotropy is 0.17 and the threshold voltage is 1.18 V.

EXAMPLE 4

A dielectric consisting of
12% of 4-ethyl-1-(4-cyanophenyl)-cyclohexane,
23% of 4-n-butyl-1-(4-cyanophenyl)-cyclohexane,
14% of 4-ethyl-4'-cyanobiphenyl,
10% of 4-propyloxy-4'-cyanobiphenyl, 20% of 4-(4-ethylcyclohexyl)-benzoic acid 4'-propylcyclohexyl ester and
21% of 4-(4-n-butylcyclohexyl)-benzoic acid 4'-propylcyclohexyl ester has a Mp. of −3°, a Cp. of 67° and a viscosity of 29·10⁻³ Pa seconds at 25°. The DKA is 8.6 and the optical anisotropy is 0.13. This dielectric is distinguished by a very steep gradient of the plot of its contrast versus the voltage applied, a low dependence of the threshold voltage on the temperature and a low dependence of the contrast on the angle of observation. It is especially suitable for multiplex-operation; for this purpose, an operating voltage of 3 V suffices.

EXAMPLE 5

A dielectric consisting of
8% of 4-ethyl-1-(4-cyanophenyl)-cyclohexane,
31% of 4-n-butyl-1-(4-cyanophenyl)-cyclohexane,
16% of 4-ethyl-4'-cyanobiphenyl,
14% of 4-propyloxy-4'-cyanobiphenyl,
7% of 4-(4-ethylcyclohexyl)-benzoic acid 4'-cyanophenyl ester,
8% of 4-(4-n-pentylcyclohexyl)-benzoic acid 4'-cyanophenyl ester
7% of 4-(4-n-heptylcyclohexyl)-benzoic acid 4'-cyanophenyl ester and
9% of 4-N,N-dimethylamino-benzonitrile has a Mp. of 0°, a Cp. of 60° and a viscosity of 45·10⁻³ Pa seconds at 20°. The DKA is 16.0 and the threshold voltage is 0.96 V. This dielectric is outstandingly suitable for a liquid-crystal cell with static triggering and an operating voltage of 1.5 V.

EXAMPLE 6

A dielectric consisting of
23.5% of 4-ethyl-1-(4-cyanophenyl)-cyclohexane,
25% of 4-n-butyl-1-(4-cyanophenyl)-cyclohexane,
15% of 4-ethyl-4'-cyanobiphenyl,
12% of 4-n-propyloxy-4'-cyanobiphenyl,
17.5% of 4-(4-n-pentylcyclohexyl)-4'-cyanobiphenyl, and
7% of 4-(4-n-pentylcyclohexyl)-benzoic acid-4'-cyanophenylester has a melting point of −3°, a clearing point of +68° and a viscosity of 36·10⁻³ Pa seconds at 20°. The DKA is 13.8 and the threshold voltage is 1.46 V. This dielectric is very well suitable for liquid crystal cells with static or multiplex drive as well.

EXAMPLE 7

A dielectric consisting of
21% of 4-ethyl-1-(4-cyanophenyl)-cyclohexane,
22% of 4-n-butyl-1-(4-cyanophenyl)-cyclohexane,
14% of 4-ethyl-4'-cyanobiphenyl,
18% of 4-n-butyl-4'-cyanobiphenyl,
16% of 4-(4-n-pentylcyclohexyl)-4'-cyanobiphenyl, and
9% of 4-n-pentyl-4''-cyanoterphenyl has a melting point of −6°, a clearing point of 64° and a viscosity of 32·10⁻³ Pa seconds at 20°. The DKA is 13.2 and the threshold voltage is 1.42 V. This low viscosity mixture is highly suitable in liquid crystal cells with static drive.

EXAMPLE 8

A dielectric consisting of
15% of 4-ethyl-1-(4-cyanophenyl)-cyclohexane,
25% of 4-n-butyl-1-(4-cyanophenyl)-cyclohexane,
15% of 4-ethyl-4'-cyanobiphenyl,
11% of 4-n-propyloxy-4'-cyanobiphenyl,
14% of 4-(4-ethylcyclohexyl)-benzoic acid 4'-n-propylcyclohexyl ester, and
20% of 4-(4-n-butylcyclohexyl)-benzoic acid 4'-n-propyl-cyclohexyl ester has a melting point of −2°, a clearing point of 60° and a viscosity of 46·10⁻³ Pa seconds at 20°. The DKA is 8.3. The optical anisotropy which is responsible for the dependence of the contrast on the angle of observation is 0.14.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

We claim:

1. A liquid-crystalline dielectric having a positive dielectric anisotropy comprising at least one biphenyl derivative of the formula

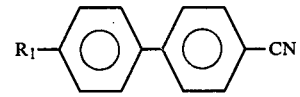

wherein $R_1$ is alkyl of 1–4 C atoms or alkoxy of 1–3 C atoms, and at least one phenylcyclohexane derivative of the formula

wherein $R_2$ is alkyl of 1–4 C atoms, in a weight ratio of 3:1 to 1:3, said dielectric containing at least four of said biphenyl and phenylcyclohexane derivatives combined.

2. A liquid-crystalline dielectric having a positive dielectric anisotropy comprising at least one biphenyl derivative of the formula

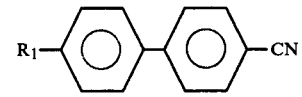

wherein $R_1$ is alkyl of 1–4 C atoms or alkoxy of 1–3 C atoms, and at least one phenylcyclohexane derivative of the formula

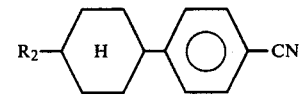

wherein $R_2$ is alkyl of 1–4 C atoms, in a weight ratio of 3:1 to 1:3, and further comprising a cyclohexane derivative of the formula

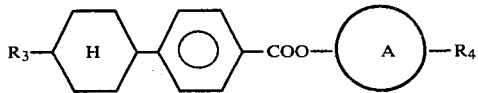

wherein the ring A is 1,4-disubstituted phenyl or cyclohexane and $R_3$ and $R_4$ are each straight-chain alkyl of 1–8 C; or, if ring A is phenyl, $R_4$ is also alkoxy or alkanoyloxy, of up to 8 C atoms in each case, or CN.

3. The liquid-crystalline dielectric of claim 1 or 2, wherein the weight ratio is 2:1 to 1:2.

4. The liquid-crystalline dielectric of claim 1 or 2, containing at least 55 percent by weight of the biphenyl and phenylcyclohexane derivatives combined.

5. In a liquid-crystal display element comprising a liquid-crystalline dielectric composition, the improvement wherein the liquid-crystalline dielectric composition is that of claim 1.

6. In a liquid-crystal display element comprising a liquid-crystalline dielectric composition, the improvement wherein the liquid-crystalline dielectric composition is that of claim 2.

7. The liquid crystalline dielectric of claim 1 containing four or five of the biphenyl and phenylcyclohexane derivatives combined.

8. The liquid crystalline dielectric of claim 1 containing four of the biphenyl and phenylcyclohexane derivatives combined.

* * * * *